United States Patent [19]

Hida et al.

[11] Patent Number: 4,886,841

[45] Date of Patent: Dec. 12, 1989

[54] ULTRAVIOLET-CURABLE GEL COMPOSITION

[75] Inventors: Yoshinori Hida; Seizi Katayama, both of Annaka, Japan

[73] Assignee: Shin-Etsu Chemical Co., Ltd., Tokyo, Japan

[21] Appl. No.: 149,599

[22] Filed: Jan. 28, 1988

[30] Foreign Application Priority Data

Jan. 28, 1987 [JP] Japan .................................. 62-18028

[51] Int. Cl.$^4$ .................. C08F 283/12; C08G 77/04; C08G 77/38; C08L 83/14
[52] U.S. Cl. ........................................ 522/99; 522/172; 522/148; 525/477; 528/32
[58] Field of Search ............................ 522/99; 528/32; 525/478

[56] References Cited

U.S. PATENT DOCUMENTS

| | | |
|---|---|---|
| 4,504,629 | 3/1985 | Lien et al. .............................. 525/478 |
| 4,631,321 | 12/1986 | Suzuki ................................... 525/478 |
| 4,693,960 | 9/1987 | Babich et al. .......................... 522/99 |

Primary Examiner—John C. Bleutge
Assistant Examiner—Susan Berman
Attorney, Agent, or Firm—Birch, Stewart, Kolasch & Birch

[57] ABSTRACT

Provided herein is an ultraviolet-curable gel composition which comprises an organopolysiloxane as a principal component which is represented by the general structural formula below.

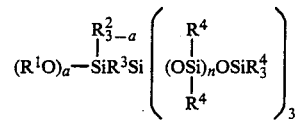

where $R^1$ is a $C_{4-25}$ monovalent organic group containing therein 1 to 2 vinyl functional groups; $R^2$ is a $C_{1-18}$ monovalent organic group having no vinyl group capable of addition polymerization; $R^3$ is a $C_{2-4}$ divalent hydrocarbon group; $R^4$ is a $C_{1-9}$ substituted or unsubstituted hydrocarbon group of the same or different kind; a is an integer of 1 to 3; and n is an integer of 5 to 500.

3 Claims, No Drawings

ULTRAVIOLET-CURABLE GEL COMPOSITION

BACKGROUND OF THE INVENTION

1. Field of the Invention

The present invention relates to a gel composition of organopolysiloxane which is easily curable with ultraviolet rays owing to the introduction thereinto of an unsaturated double bond capable of addition polymerization.

2. Description of the Prior Art

Heretofore, there has been known a thermosetting gel composition of organopolysiloxane which is cured through the addition reaction of an unsaturated double bond or triple bond and a silicon-hydrogen bond by the aid of a metal catalyst (such as platinum) or a peroxide.

A disadvantage of the conventional gel composition is that curing needs a high temperature and a long time.

SUMMARY OF THE INVENTION

The present invention overcomes the above-mentioned disadvantage. Accordingly, it is an object of the present invention to provide an ultraviolet-curable gel composition which easily cures in a short time by irradiation with ultraviolet rays.

The present inventors carried out a series of experiments on an ultraviolet-curable gel composition of organopolysiloxane which easily cures upon irradiation by ultraviolet rays. It was found that this object is achieved by the introduction of a monovalent organic group having 4 to 25 carbon atoms and containing 1 to 2 vinyl functional groups into an organopolysiloxane. More particularly, it was found that an organopolysiloxane represented by the general structural formula below readily cures when irradiated with ultraviolet rays for a short time in the presence of a photopolymerization initiator.

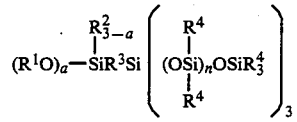

where $R^1$ is a monovalent organic group having 4 to 25 carbon atoms and containing therein 1 to 2 vinyl functional groups; $R^2$ is a monovalent organic group having 1 to 18 carbon atoms and having no vinyl group capable of addition polymerization; $R^3$ is a divalent hydrocarbon group having 2 to 4 carbon atoms; $R^4$ is a substituted or unsubstituted hydrocarbon group having 1 to 9 carbon atoms of the same or different kind; a is an integer of 1 to 3; and n is an integer of 5 to 500.

According to the present invention, a gel composition containing the above-mentioned organopolysiloxane as a main component readily cures upon irradiation of ultraviolet rays.

The above and other objects, features and advantages of the present invention will become more readily apparent from the following descriptions.

DETAILED DESCRIPTION OF THE INVENTION

The ultraviolet-curable gel composition according to the present invention has as a main component an organopolysiloxane represented by the general structural formula below.

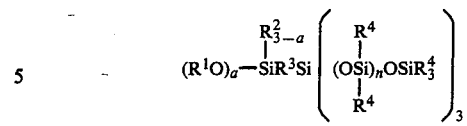

where $R^1$ is a monovalent organic group having 4 to 25 carbon atoms and containing therein 1 to 2 vinyl functional groups; $R^2$ is a monovalent organic group having 1 to 18 carbon atoms and having no vinyl group capable of addition polymerization; $R^3$ is a divalent hydrocarbon group having 2 to 4 carbon atoms; $R^4$ is a substituted or unsubstituted hydrocarbon group having 1 to 9 carbon atoms of the same or different kind; a is an integer of 1 to 3; and n is an integer of 5 to 500.

Examples of $R^1$ which is a monovalent organic group having 4 to 25 carbon atoms and containing therein 1 to 2 vinyl functional groups include $CH_2=CHCOOR-$, $CH_2=C(CH_3)COOR-$, $CH_2=CHCOR-$, $(CH_2=CHCOOR)_2R'-$, $\{CH_2=C(CH_3)COOR\}_2R'-$ and $(CH_2CHCOR)_2R'$-groups wherein R represents a substituted or unsubstituted divalent hydrocarbon group having 1 to 10 carbon atoms such as methylene group, an ethylene group, a propylene group, a butylene group, and a $CH_2CH(CH_2OC_6H_5)$ group, and R' represents $CH-$ or $CCH_3-$. More particularly, $R^1$ includes $CH_2=CHCOOCH_2CH_2-$, $CH_2=C(CH_3)COOCH_2CH_2-$, $CH_2=CHCOOCH_2CH(CH_2OC_6H_5)-$, and $\{CH_2=C(CH_3)COOCH_2\}_2CH-$. Examples of $R^2$, which is a monovalent organic group having 1 to 18 carbon atoms and having no vinyl group capable of addition polymerization, include a methyl group, an ethyl group, a propyl group, a butyl group, a pentyl group, a vinyl group, an allyl group, a phenyl group, and a tolyl group. They also include alkoxyl groups such as a methoxy group, an ethoxy group, a propoxy group, an isopropoxy group, a butoxy group, a sec-butyloxy group, a tert-butyloxy group, and a neopentyloxy group; a phenoxy group and an isopropenoxy group; and organosilicon groups such as a trimethylsiloxy group, a divinylmethylsiloxy group, phenyldimethylsiloxy group, diethylmethylsiloxy group, and a tert-butyldimethylsiloxy group. Preferred examples of $R^2$ are those which contain an isopropyl group, a tert-butyl group, or a neopentyl group which produces a desirable effect for hydrolysis. Examples of $R^3$ which is a divalent hydrocarbon group include an ethylene group, a propylene group, and a butylene group, the first being the most common. Examples of $R^4$, which is a substituted or unsubstituted hydrocarbon group include a variety of groups. Preferable examples of $R^4$ include those in which methyl groups account for more than 50% and phenyl groups etc. account for less than 35%.

The organopolysiloxane should have an adequate molecular weight, so that n is an integer from 5 to 500, preferably from 15 to 300. With an excessively small molecular weight, the organopolysiloxane provides a hard cured product; and with an excessively large molecular weight, the organopolysiloxane has such a high viscosity that it is hard to handle. The viscosity at 25° C. of the organopolysiloxane varies from 100 to 50000 centipoises depending on the molecular weight.

The organopolysiloxane represented by the general structural formula above can be obtained by any known process such as the dehydrochlorination reaction between a corresponding chlorosilane and a compound containing a vinyl group capable of addition polymerization and containing an active hydrogen.

The organopolysiloxane contains the $R^1$ group as a photosensitive group, and therefore, it can be easily cured by ultraviolet rays. For effective curing in actual use, the organopolysiloxane should preferably be incorporated with a photopolymerization initiator of benzophenone, benzoin ether, ketal, thioxanthone, acetophenone type, etc and derivatives thereof in an amount of less than 10 parts by weight, preferably 0.5 to 3 parts by weight for 100 parts by weight of the organopolysiloxane.

The gel composition of the present invention may be incorporated with a pigment, antioxidant, antistatic agent, flame retardant, silica, silicone oil and varnish, and organic and inorganic fillers, in such an amount that they do not impair the transparency of the gel composition to ultraviolet rays.

The gel composition of the present invention readily cures upon irradiation by ultraviolet rays for a short time and provides a thick cured product of organopolysiloxane. The irradiation of the gel composition by ultraviolet rays may be carried out in a usual way, for example, by using an ultraviolet lump such as a high-pressure mercury lamp, a metal halide lamp and the like at 80~160 W/cm for 0.1 second to several ten seconds.

The gel composition provides a cured product with a minimum amount of blurring because the organopolysiloxane has at least one functional group in its one molecule. Moreover, the gel composition of the present invention cures rapidly under ultraviolet irradiation and the cured product has good heat resistance and water resistance and changes very little in hardness over a broad temperature range. Therefore, it finds use under various conditions such as potting of electric and electronic parts and protection of optical fibers.

To further illustrate the invention, and not by way of limitation, the following synthesis examples and operative examples are given.

Synthesis Example

In a 1000-ml reactor equipped with a stirrer, reflux condenser, and dry air inlet were placed 663 g of organopolysiloxane represented by the general structural formula below and 250 g of toluene, and to the reaction system were further added 7.0 g of triethylamine and 0.3 g of dibutylhydroxytoluene.

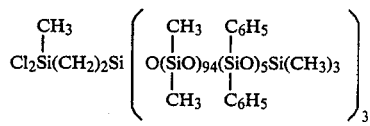

To the reaction system was added with thorough stirring a compound represented by the structural formula below.

Reaction was carried out at 70° C. for 3 hours. Then, 2.8 g of neopentyl alcohol was added and the reaction system was stirred at 80° C. for 5 hours. After the completion of reaction, the reaction product was filtered and the solvent was distilled away at 100° C. under reduced pressure. After repeated filtration, there was obtained a clear, oily organopolysiloxane represented by the formula below.

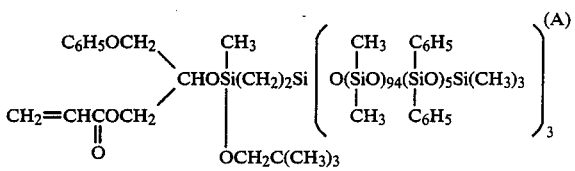

Organic polysiloxanes represented by the formulas B to D below were prepared in the same manner as above.

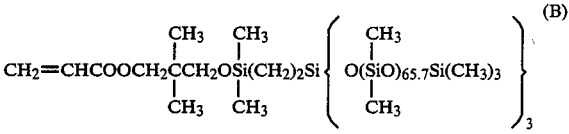

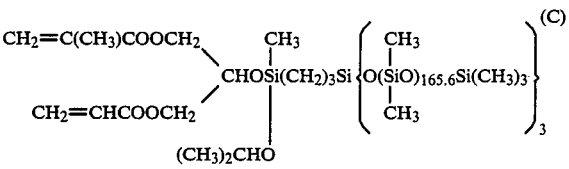

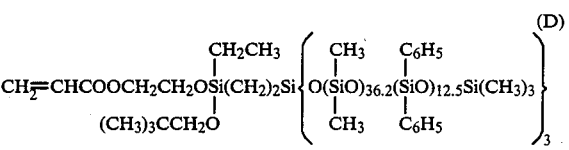

EXAMPLE

One hundred parts by weight of each of the oily organopolysiloxanes A to D obtained in the above-mentioned synthesis example was incorporated with 1 part by weight of a photopolymerization initiator represented by the following formula.

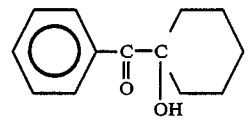

The mixture was placed in a glass Petri dish up to a level of 10 mm and irradiated for 10 seconds with ultraviolet rays from a high-pressure mercury lamp placed 10 cm away. All the polysiloxanes A to D readily cured.

The cured products of the organopolysiloxanes A to D were examined for penetration using a ¼ micropenetrometer according to ASTM D-1403. The values of penetration were 77, 71, 86 and 65, respectively.

What is claimed is:

1. An ultraviolet-curable gel composition which comprises an organopolysiloxane as a principal component which is represented by the general structural formula below.

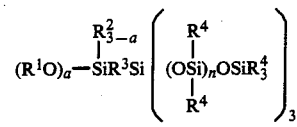

where $R^1$ is a monovalent organic group having 4 to 25 carbon atoms and containing therein 1 to 2 vinyl functional groups; $R^2$ is a monovalent organic group having 1 to 18 carbon atoms and having no vinyl group capable of addition polymerization; $R^3$ is a divalent hydrocarbon group having 2 to 4 carbon atoms; $R^4$ is a substituted or unsubstituted hydrocarbon group having 1 to 9 carbon atoms of the same or different kind; a is an integer of 1 to 3; and n is an integer of 5 to 500.

2. The composition as defined in claim 1, wherein a photopolymerization initiator is further added in an amount of less than 10 parts by weight for 100 parts by weight of said organopolysiloxane.

3. The composition as defined in claim 2, wherein the photopolymerization initiator is selected from the group consisting of benzophenone, benzoin ether, ketal, thioxanthone, acetophenone and derivatives thereof.

* * * * *